United States Patent Office 3,833,630
Patented Sept. 3, 1974

3,833,630
PREPARATION OF ANTIMONY GLYCOLOXIDE
Otto Ernest Loeffler, Rahway, N.J., assignor to NL
Industries, Inc., New York, N.Y.
No Drawing. Filed Aug. 24, 1973, Ser. No. 391,122
Int. Cl. C07f 9/90
U.S. Cl. 260—446
10 Claims

ABSTRACT OF THE DISCLOSURE

A novel process for the production of antimony glycoloxide is described which comprises; heating a mixture of ethylene glycol and an antimony trisorganic carboxylate; wherein the mole ratio of ethylene glycol to antimony trisorganic carboxylate is at least 1.5; and separating an organic carboxylic acid from said mixture, said organic carboxylic acid having a boiling point below the boiling point of ethylene glycol in said mixture.

BACKGROUND OF THE INVENTION

This invention is concerned with a novel process for the production of antimony glycoloxide, $$Sb_2(OCH_2CH_2O)_3.$$

Antimony glycoloxide has been used as a catalyst in the condensation polymerization of a polycarboxylic acid derivative with a polyalkylene glycol such as in the formation of polyethylene terephthalate from dimethyl terephthalate and ethylene glycol.

In the past, antimony glycoloxide has been produced by the reaction of antimony trioxide with large molar excesses of ethylene glycol at high temperatures. Although yields of antimony glycoloxide are satisfactory by this process it suffers from several disadvantages. Long reaction times of as much as 24 to 30 hours are required. The antimony glycoloxide product obtained is difficult to filter from the viscous ethylene glycol reaction medium. Very often an impure product is obtained due to the presence of color bodies or other impurities in the antimony trioxide starting material or due to unreacted antimony trioxide.

The instant invention alleviates the problems associated with the aforementioned process by producing antimony glycoloxide in high purity. The instant process employs relatively short reaction times and gives an antimony glycoloxide product which can be easily filtered from its reaction medium in substantially pure form.

SUMMARY OF THE INVENTION

The instant invention provides a process for producing antimony glycoloxide by the reaction of an antimony trisorganic carboxylate with at least a 1.5 molar excess of ethylene glycol. The formed antimony glycoloxide precipitates from the reaction mixture and is easily separated therefrom as for example by filtration. Preferably elevated temperatures are employed for the reaction, in the range of from about 80° C. to 192° C.

The preferred embodiment of this invention for producing antimony glycoloxide in high yield comprises:

(a) heating a mixture of ethylene glycol and an antimony trisorganic carboxylate wherein the mole ratio of ethylene glycol to antimony trisorganic carboxylate is at least 1.5:1;
(b) separating an organic carboxylic acid from said mixture; and
(c) recovering antimony glycoloxide.

The antimony triscarboxylates of this invention can be represented by the formula;

where Sb is antimony and $R_1$, $R_2$ and $R_3$ are each an anion radical of an organic carboxylic acid; said acid having a boiling point below the boiling point of the ethylene glycol.

The anion radicals of the organic carboxylic acids include those derived from acids having from 1 to 5 carbon atoms such as formic acid, acetic acid, propionic acid, butyric acid, valeric acid and their isomers. Substituted derivatives of the above acids may also be employed provided they boil below the boiling point of ethylene glycol. Mixtures of organic carboxylic acid anions may also be employed.

In the course of the reaction, the carboxylate anion radicals of the antimony trisorganic carboxylate are replaced by ethylene glycol anion radicals to form the antimony glycoloxide product and the corresponding acid of the replaced carboxylate anion which is separated from the reaction mixture by distillation when its boiling point is reached.

As the organic carboxylic acid is removed, the reaction is driven to completion. If the carboxylic acid is not removed it may compete with the ethylene glycol in reacting with the antimony triscarboxylate and antimony glycoloxide will be formed in reduced yield together with antimony products containing anions of volatile organic carboxylic acids.

The amount of ethylene glycol must be at least 1.5 molar with respect to the amount of antimony triscarboxylate in the mixture. If lower amounts are employed, the final product will contain complex mixtures of antimony glycoloxides and carboxylates with low amounts of antimony glycoloxide. Preferably excess ethylene glycol is used to insure complete reaction.

A solvent for the antimony trisorganic carboxylate and ethylene glycol is preferably added to the mixture to aid in the recovery of the antimony glycoloxide and to insure homogeneous mixing of the reactants. The solvent must be inert to the antimony trisorganic carboxylate and have a boiling point in excess of the boiling point of the organic carboxylic acid to be removed as a by-product of the reaction. Among such solvents include xylene, cumene and m-propyltoluene. Solvents having lower boiling points than the acid to be distilled may also be employed if such solvents are capable of forming an azeotropic distillate with the acid.

The proper temperatures to be used in heating the antimony trisorganic carboxylate and ethylene glycol are governed by the boiling points of the organic carboxylic acids to be removed in the reaction. However, temperatures above 192° C. at room pressures are to be avoided since, loss of ethylene glycol by distillation occurs above 192° C. Lower reaction temperatures for removal of organic carboxylic acid may be employed if the reaction is carried out for example under reduced pressure.

A particularly preferred antimony trisorganic carboxylate is antimony triacetate wherein $R_1$, $R_2$ and $R_3$ are each

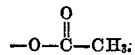

Antimony triacetate is readily available, relatively inexpensive and due to the low boiling point of acetic acid formed (118° C.), allows production of the antimony glycoloxide using relatively low temperatures.

The reaction mixture after heating is cooled to room temperature and the antimony glycoloxide recovered as for example by filtration. It was found that the antimony glycoloxide filters easily using a standard filtering apparatus such as a Buchner funnel.

Yields of antimony glycoloxide product by this reaction are as high as 95% and the product shows substantial purity.

DESCRIPTION OF THE PREFERRED EMBODIMENTS

The antimony trisorganic carboxylates useful in this invention can be produced by methods known in the art. For example, 3 moles of an appropriate carboxylic acid can be reacted with 1 mole of an antimony trihalide in the presence of a suitable acid halide acceptor such as ammonia to form the desired antimony trisorganic carboxylate. Antimony triscarboxylates comprising mixtures of anions of organic carboxylic acids can be prepared by first reacting 1 or 2 moles of one carboxylic acid with an antimony trihalide as described above and then subsequent additions of 1 or 2 moles of a different carboxylic acid to produce the desired antimony triscarboxylate.

Antimony triacetate can be prepared by reacting 3 moles of acetic anhydride with a mole of antimony trioxide as well known in the art.

The foregoing methods of preparation are given in brief as illustrative of the preparation of the antimony starting materials of this invention. Other methods as known to those skilled in the art can be utilized to prepare these materials.

The anions of organic carboxylic acids preferable in this invention include the anions of straight chained and branched chained aliphatic organic carboxylic acids having from 1 to 5 carbon atoms such as formic acid, acetic acid, propionic acid, butyric acid, isobutyric acid, valeric acid, isovaleric acid and mixtures thereof. These acids distill below the boiling point of ethylene glycol, are readily available and relatively inexpensive.

Other acids which may be used include $\alpha$-halo acetic acids such as choloracetic acid, dicholoracetic acid, fluoroacetic acid, difluoroacetic acid; substituted acetic acids such as methoxyacetic acid and acetoacetic acid and unsaturated acids such as acrylic acid, methacrylic acid, crotonic acid and 4-pentenoic acid. However, any organic carboxylic acid can be used in the invention as long as it has a boiling point below the boiling point of ethylene glycol in the reaction mixture.

The use of a solvent is preferred in this invention to aid in the recovery of the product and to provide mixing of the reactants. The amount of solvent is not critical and should be used in amounts to provide efficient mixing of reactants. Generally, the volume of solvent is from 1 to 3 times the volume of ethylene glycol. The solvent selected must have a boiling point in excess of the boiling point of the acid to be distilled. For example, if antimony trisacetate is used as the antimony triscarboxylate, a solvent such as o-xylene which boils at 143° C. is satisfactory; if butyric acid is to be removed a solvent such as n-propyl toluene which boils at 176° C. is satisfactory. Ethylene glycol used in large excess can also act as the solvent.

The heating of the reaction mixture is continued until all volatile organic carboxylic acid is removed by distillation. This can be determined by noting a sharp increase in temperature of the distilling vapors or by measuring the amounts of volatile acid distilled and comparing that amount with the theoretical amount which should be removed. If desired, the reaction may be stopped before all acid is removed, however, yield will be decreased. The time required to complete the reaction varies depending on the temperature and ease of the distillation of the starting material. In general between 8 and 20 hours are sufficient.

After the reaction is complete the antimony glycoloxide separates from the reaction mixture as a white crystalline material which can be easily recovered by filtration. The antimony glycoloxide is washed with a suitable solvent and dried.

It has been found that yields of up to 95% of substantially pure antimony glycoloxide are obtained by this process.

In order to more fully describe the instant invention the following examples are given.

EXAMPLE 1

This example illustrates the preparation of antimony glycoloxide using antimony trisacetate as the antimony trisorganic carboxylate.

Antimony trisacetate, 70.8 g. (0.42 m.) (wet) was combined with 43.6 g. (0.7 m.) of ethylene glycol and 150 ml. of xylene in a 500 ml. flask attached to which was a reflux condenser and Dean-Stark tube. The mixture was heated at reflux (143° C.) for 20 hours after which the amount of acetic acid in the Dean-Stark tube indicated all acetic acid had been removed. The mixture was cooled to room temperature and filtered through a Buchner funnel. After drying the product weighed 46 g. indicating a 93% yield.

Analysis for antimony glycoloxide: (percent Sb)

Sb: Percent
Theoretical _____ 57.5
Actual _____ 58.0

EXAMPLE 2

This example illustrates the preparation of antimony glycoloxide using antimony trisbutyrate as the antimony triscarboxylate in excess ethylene glycol. Antimony trisbutyrate, 15.2 g. (.04 m.) was combined with 105 g. (1.7 m.) of ethylene glycol in a 250 ml. flask attached to which was a reflux condenser and Dean-Stark tube. The mixture was heated at 184–186° C. for 8 hours after which no additional butyric acid distilled off. The mixture was cooled to room temperature and filtered through a Büchner funnel. Yield was approximately 94%.

Analyis of antimony glycoloxide: (Percent Sb)

Sb: Percent
Theoretical _____ 57.5
Actual _____ 56.54

EXAMPLE 3

This example illustrates a process for producing antimony glycoloxide wherein no organic carboxylic acid was removed from the reaction mixture.

Antimony trisacetate was heated with a large molar excess of ethylene glycol at 80–85° C. until complete dissolution of the carboxylate took place. On standing after 3 days, a small amount of precipitate was formed in the solution. After 5 days a substantial amount of precipitate was formed which was determined as antimony glycoloxide.

EXAMPLE 4

This example illustrates the process for producing antimony glycoloxide wherein the organic carboxylic acid is separated from the mixture at relatively low temperature under vacuum.

About 32 g. of antimony trisacetate was combined with 75 g. of ethylene glycol in a reaction flask equipped with a vacuum distillation apparatus connected to a vacuum pump. The mixture was heated 57–58° C. under a vacuum of 0.35 mm. Hg for 1.5 hours after which no further distillation of acetic acid was observed. The yield of product after recovery was 92%. Analysis of the product for percent Sb gave 57.34; theoretical; 57.50%.

What is claimed is:

1. A process for the preparation of antimony glycoloxide which comprises reacting an antimony trisorganic carboxylate with at least 1.5 molar equivalents of ethylene glycol.

2. A process for the preparation of antimony glycoloxide which comprises;
(a) heating a mixture of an antimony trisorganic carboxylate and ethylene glycol wherein the mole ratio of ethylene glycol to antimony trisorganic carboxylate is at least 1.5:1;
(b) separating an organic carboxylic acid from said mixture, said acid having a boiling point below the boiling point of said ethylene glycol; and
(c) recovering antimony glycoloxide from said mixture.

3. The process of Claim 1 wherein said mixture further comprises a solvent.

4. A process for the preparation of antimony glycoloxide comprising;
(a) heating a mixture of ethylene glycol and an antimony trisorganic carboxylate represented by the formula;

wherein Sb is antimony, $R_1$, $R_2$ and $R_3$ are each an anion radical of an organic carboxylic acid, said acid having a boiling point below the boiling point of ethylene glycol in said mixture, to form said antimony glycoloxide and the organic carboxylic acid of said anion radical; wherein the mole ratio of ethylene glycol to said antimony trisorganic carboxylate is at least 1.5:1;
(b) separating said organic carboxylic acid from said mixture; and
(c) recovering said antimony glycoloxide from said mixture.

5. The process of Claim 3 wherein said mixture further comprises a solvent; said solvent having a boiling point above the boiling point of said organic carboxylic acid.

6. The process of Claim 3 wherein said anion radical of an organic carboxylic acid contains from 1 to 5 carbon atoms.

7. The process of Claim 3 wherein said antimony trisorganic carboxylate is antimony trisacetate.

8. The process of Claim 3 wherein said antimony trisorganic carboxylate is antimony trisbutyrate.

9. A process for preparing antimony glycoloxide which comprises;
(a) heating a mixture of ethylene glycol, a solvent and an antimony trisorganic carboxylate selected from the group consisting of antimony trisacetate, antimony trisbutyrate and mixtures thereof; said solvent having a boiling point above the boiling point of acetic acid; wherein the mole ratio of said ethylene glycol to said antimony trisorganic carboxylate is at least 1.5:1;
(b) separating from said mixture an acid selected from the group consisting of acetic and butyric acid; and
(c) recovering antimony glycoloxide from said mixture.

10. The process of Claim 9 wherein said mixture is heated under reduced pressure.

References Cited
UNITED STATES PATENTS

| | | | |
|---|---|---|---|
| 3,109,853 | 11/1963 | Worsley et al. | 260—446 |
| 3,676,477 | 7/1972 | Chay et al. | 260—446 |
| 3,732,182 | 5/1973 | Chimura et al. | 260—446 |
| 3,763,202 | 10/1973 | Cumbo et al. | 260—446 |

DANIEL E. WYMAN, Primary Examiner

A. P. DEMERS, Assistant Examiner

U.S. Cl. X.R.

452—431 R